(12) United States Patent
Menard

(10) Patent No.: US 9,172,491 B2
(45) Date of Patent: Oct. 27, 2015

(54) METHOD, TOPOLOGY AND POINT OF PRESENCE EQUIPMENT FOR SERVING A PLURALITY OF USERS VIA A MULTIPLEX MODULE

(71) Applicant: AEPONYX INC., Repentigny (CA)

(72) Inventor: François D. Menard, Trois-Rivieres (CA)

(73) Assignee: Aeponyx Inc., Repentigny (CA)

( * ) Notice: Subject to any disclaimer, the term of this patent is extended or adjusted under 35 U.S.C. 154(b) by 0 days.

(21) Appl. No.: 14/374,848

(22) PCT Filed: Jan. 30, 2013

(86) PCT No.: PCT/CA2013/000086
§ 371 (c)(1),
(2) Date: Jul. 25, 2014

(87) PCT Pub. No.: WO2013/113098
PCT Pub. Date: Aug. 8, 2013

(65) Prior Publication Data
US 2015/0010298 A1    Jan. 8, 2015

Related U.S. Application Data

(60) Provisional application No. 61/592,043, filed on Jan. 30, 2012.

(51) Int. Cl.
*H04J 14/02* (2006.01)
*H04B 10/03* (2013.01)
*H04B 10/038* (2013.01)
*H04L 29/14* (2006.01)

(52) U.S. Cl.
CPC ............ *H04J 14/0287* (2013.01); *H04B 10/03* (2013.01); *H04B 10/038* (2013.01); *H04L 69/40* (2013.01)

(58) Field of Classification Search
CPC ... H04J 14/0287; H04B 10/038; H04B 10/03; H04L 69/40
See application file for complete search history.

(56) References Cited

U.S. PATENT DOCUMENTS

| 7,035,540 B2 | 4/2006 | Finan et al. |
| 7,389,043 B2 | 6/2008 | Bernier et al. |
| 2002/0196802 A1* | 12/2002 | Sakov et al. .................. 370/432 |

(Continued)

FOREIGN PATENT DOCUMENTS

| EP | 2164221 A1 | 3/2010 |
| WO | 2007129993 A1 | 11/2007 |
| WO | 2011072073 A2 | 6/2011 |

OTHER PUBLICATIONS

International Search Report of PCT/CA2013/000086. May 7, 2013. Salvatore Ginese. Canadian Intellectual Property Office.

*Primary Examiner* — Jay P Patel
(74) *Attorney, Agent, or Firm* — Rosenberg, Klein & Lee

(57) ABSTRACT

A number of users interface with a network via a multiplex module, on a communication path established between the multiplex module and a point of presence. Some users may be served by one or more first channels of the communication path while one or more remaining users may be served by one or more additional channels of the communication path. Users having a basic service level agreement may be served by the first channels while users having an extended service level agreement may be served by the one or more additional channels. Allocation of users to distinct channel types based on their service level agreements may apply at a primary point of presence or may apply at a redundant point of presence.

30 Claims, 5 Drawing Sheets

(56) References Cited

U.S. PATENT DOCUMENTS

| | | | |
|---|---|---|---|
| 2004/0190444 A1* | 9/2004 | Trudel et al. | 370/224 |
| 2005/0047713 A1* | 3/2005 | Antosik | 385/24 |
| 2006/0239609 A1 | 10/2006 | Sorin et al. | |
| 2007/0147837 A1 | 6/2007 | Yoo et al. | |
| 2008/0267192 A1* | 10/2008 | Blinick et al. | 370/395.7 |
| 2009/0092389 A1 | 4/2009 | Wei et al. | |
| 2010/0135661 A1 | 6/2010 | Youn et al. | |
| 2011/0317997 A1* | 12/2011 | Satou | 398/20 |

* cited by examiner

US 9,172,491 B2

METHOD, TOPOLOGY AND POINT OF PRESENCE EQUIPMENT FOR SERVING A PLURALITY OF USERS VIA A MULTIPLEX MODULE

TECHNICAL FIELD

The present disclosure relates to the field of telecommunications. More specifically, the present disclosure relates to a method, a topology and point of presence equipment for serving a plurality of users interfacing with a network via a multiplex module.

BACKGROUND

Current telecommunication systems can offer to their users data rates that seemed out of reach just a few years ago. Optical fiber systems are among those offering the highest bandwidth and capacity. For example, on a grid spacing of 100 GHz, dense wavelength division multiplexing (DWDM) systems may support up to 40 bidirectional channels on a single fiber installed between a network point of presence (POP) and a local multiplexer-demultiplexer, serving each of 40 distinct users, each user having bitrates up to one hundred (100) gigabits per second (GBPS).

Whereas each channel is formed of the combination of one or more lambdas, or wavelengths, within one band or multiple lambdas across multiple bands, for example an L-band channel and a C-band channel in each direction, on the same optical fiber with 100 GHz spacing, means that at any point in time, 80 lambdas may be used simultaneously on a single fiber. With smaller grid spacing, such as with 50 GHz or smaller, the number of channels increases accordingly to 160, or even more for smaller grid spacing such as 25 GHz or 12.5 GHz. The present disclosure applies irrespective of the number of channels or fiber optic bands (C, L but also O, E, S, U).

Telecommunication operators oftentimes define their network provisioning practices as service-level agreements (SLA) for their users, defining parameters such as guaranteed data rates and availability guarantees. For example, some users may be satisfied with "good" availability guarantees and may enter with their service provider into a contractual agreement that a given high data rate will be available 99% of the time and that at least a limited data rate will remain available 1% of the time. Some other users may have very strict availability requirements, specifying for example that a high data rate will be available 99.999% of the time; this availability level is known to those skilled in the art as a "five nines" level.

Modern telecommunication systems are very reliable, but are nevertheless not entirely fault-free. Providing very high availability requires some level of network redundancy. Various solutions have traditionally been used for providing high-availability in telecommunication systems. However, these solutions are generally costly and may be inefficient.

A commonly known network topology assigns two neighbor nodes to each of its nodes, thereby forming a ring of nodes. Data exchanged between two non-neighbor nodes needs to pass through other nodes located therebetween along the ring. In case of a link failure between two given neighbor nodes, data may still pass through all other nodes along the ring, bypassing the failed link. This so-called ring topology is very reliable. However, as data between any two nodes must pass through other nodes located therebetween along the ring, each node needs to be dimensioned for supporting traffic from the entire network. Additionally, because data between any two nodes may transit through one or several other nodes, depending on their location on the ring, it is difficult to guarantee a low communication delay using the ring topology.

Of course, another fairly simple solution to the need for high availability may be to simply double a number of communications paths and/or of an amount of equipment usually provided for serving users under normal conditions. If a first communication path or a first set of equipment breaks, another set of equipment across a first communication path or across an alternative communication path may takeover the entire load, without loss of capacity or quality of service until normal network conditions are re-established. Other solutions may offer a somewhat reduced quality of service, using an ample amount of redundant equipment.

As a well-known example, a single Wavelength Division Multiplex Passive Optical Network (WDM-PON) 40-channel system at a first point of presence (POP) usually comprises up to 40 terminals (at full capacity) for generating 40 different wavelengths for 40 distinct users connected to the POP via a single optical fiber. In case of failure of a first WDM-PON POP or of a first fiber, an alternative POP also comprising up to 40 terminals connected towards one or more of the first 40 users via an additional fiber, may take over. Obviously, the cost of such a solution may be prohibitive as there would be a need to provide for as many terminals as end-users enlisted for protection against network failures, on both the first POP as well as on one or more alternative POPs.

A single transceiver at an alternative POP may serve the 40 users, in a pure time division multiplex fashion, by allocating on average 2.5% of a shared channel to each user. This solution is cost effective and may satisfy many users. In a time division multiple access fashion, using dynamic bandwidth allocation (DBA), an average distribution of timeslots in the shared channel may be apportioned differently between users. At certain times, shared use of a single transceiver may impair some users requiring high bitrates, preventing them from obtaining the desired quality of service.

Therefore, there is a need for cost effective network bandwidth allocation and redundancy solutions that provide high data rates for some data users.

SUMMARY

According to the present disclosure, there is provided a method of providing redundant connections to N users interfacing with a network via a multiplex module. A point of presence (POP) detects a communication failure between the multiplex module and a peer POP. N−M of the N users are served via S first channels of a communication path established between the POP and the multiplex module, the communication path having K+S installed channels. M remaining users are served via K second channels of the communication path.

According to the present disclosure, there is also provided a point of presence (POP) for serving N users interfacing with a network via a multiplex module. The POP comprises a communication port supporting K+S installed channels of a communication path established toward the multiplex module. The POP also comprises a channelizer for serving N−M users via S first channels of the communication port and for serving M remaining users via K second channels of the communication port.

According to the present disclosure, there is also provided a method of providing redundant connections to N users interfacing with a network via a multiplex module. The N users are normally served via a first communication path having at least N installed channels, established between a first point of presence (POP1) and the multiplex module. In case of failure of the first communication path, N−M of the N users are served via S first channels of a second communication path having K+S installed channels, the communication path being established between a second point of presence (POP2) and the multiplex module. M remaining users are served via K second channels of the second communication path.

The present disclosure further relates to a topology for providing redundant connections to N users interfacing with a network via a multiplex module. The topology comprises two points of presence (POP) and a channelizer. A first point of presence (POP1) normally serves the N users via a first communication path. The first communication path is established between the POP1 and the multiplex module, and has at least N installed channels. A second point of presence (POP2) comprises a second communication path having K+S installed channels. The second communication path is established between the POP2 and the multiplex module. The second communication path serves the N users in case of failure of the first communication path. The channelizer serves N−M of the users via S first channels of the second communication path and serves M remaining users via K second channels of the second communication path.

The present disclosure also introduces a method of serving N users interfacing with a network via a multiplex module. N−M of the N users are served via S first channels of a communication path established between a POP and the multiplex module, the communication path having K+S installed channels. M remaining users are served via K second channels of the communication path.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which.

DETAILED DESCRIPTION

Figure 1A:
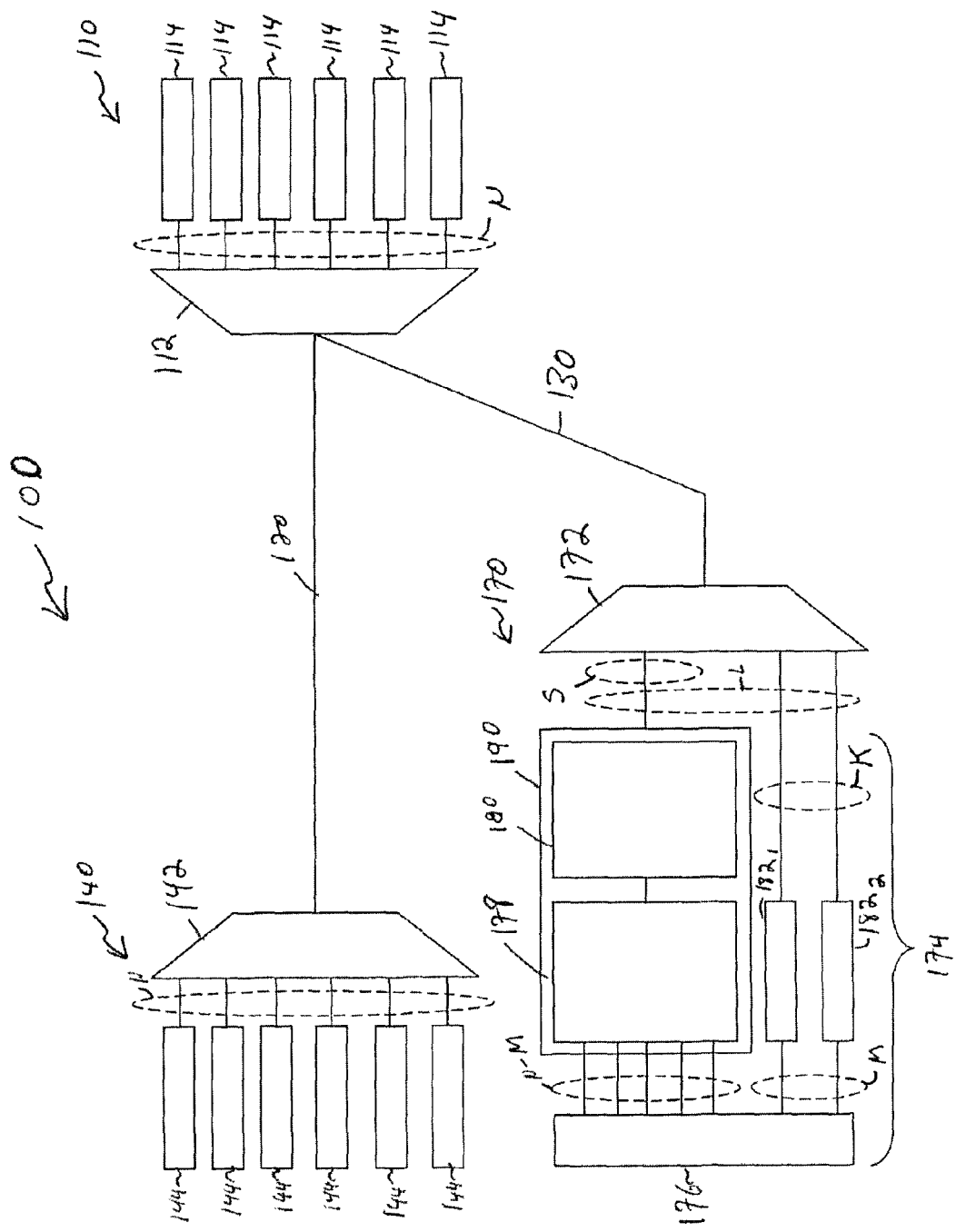
FIG. 1A is a first example of a network topology for providing redundant connections to a plurality of users.

Various aspects of the present disclosure generally address one or more of the problems of providing cost effective network redundancy solutions, including provision of high bitrates for some data users.

The following terminology is used throughout the present disclosure:

Channel: a subset of a communication path's bandwidth.

Installed channel: a subset of a communication path's bandwidth that is associated with equipment for transmitting and/or receiving within the channel.

Wavelength: a channel of an optical communication path, for example of a fiber, also called a lambda; a wavelength (i.e. a lambda) that is not associated with any equipment is commonly called a "dark channel".

Multiplex module: unidirectional or bidirectional equipment, capable of multiplexing or demultiplexing wavelengths or frequencies, or capable of both functions; this concept is applicable to a variety of media, for example fiber optic wavelengths, radio-frequency signals, and the like.

Point of Presence (POP): access point to a network, for example to the Internet, generally located at a specific physical location.

Service level agreement (SLA): a contractual agreement, between a service provider and a user, defining a normal level of service and possibly defining a minimal level of service during abnormal conditions.

Communication path: communication link between two or more communication end-points, the link being either direct or indirect, including a plurality of links and equipments.

Optical path: communication path implemented using optical fiber(s).

Channel pool: ensemble of all channels on a communication path from the point of view of their allocation to users; by definition a channel pool excludes dark channels.

Color: a wavelength corresponding to a channel on an optical path.

Communication failure: capability reduction below an agreed level of service of a communication path, or complete failure of the communication path. Communication failure includes failure of any node or link along the communication path, including nodes at each end of the communication path.

Flow: packet switched data stream flowing within a channel.

Time division multiplex (TDM): manner of multiplexing data flows on a channel by defining sub-channels, in which data flows are separated in timeslots over the channel.

Time division multiple access (TDMA): manner of multiplexing data flows on a channel by defining sub-channels, in which data flows are separated in timeslots of varying duration over the channel.

Communication port: endpoint of a communicating equipment for sending and/or receiving data on a communication path.

Channelizer: device or module for assigning distinct data flows on various channels or sub-channels.

Broadband laser: laser for use in a fiber optics system, capable of emitting light over a wide wavelength spectrum.

Tunable filter: filter capable of receiving a command for selecting a wavelength (or frequency) among a spectrum of wavelengths (or frequencies).

Tunable laser: laser for use in a fiber optics system, capable of receiving a command for emitting light at a selectable wavelength.

Terminal: a device capable of communicating one-way or two-way over a communication path.

Transceiver: a terminal having both transmit and receive capabilities within a common enclosure.

Synchronizer: a device or module capable of ensuring synchronicity between inputs, outputs, components, and combinations thereof.

Database: a device or module having memory capabilities for recording information.

Operably connected: functionally connected, whether directly or indirectly.

User: person acting as an end-point for consuming a communication service or, by extension, an apparatus acting as an end-point for a communication session.

Hub: a common node of a multipoint topology.

Spoke: a leaf node of a multipoint topology.

The following numerical designations are used throughout the present disclosure:

N: a number of users (persons or terminals) connected to a network via a same multiplex module and acting as endpoints for consuming a communication service. By extension, N may also designated a number of installed channels for normally serving the N users.

M: a subset of N users having higher priority requirements than remaining N–M users.

K: a number of channels specifically installed for serving M high priority users, particularly but without limitation at a redundant POP upon failure of a peer POP or of a communication path leading to the peer POP.

S: a number of channels specifically installed for serving N–M regular priority users, particularly but without limitation at a redundant POP upon failure of a peer POP or of a communication path leading to the peer POP.

L: a number of channels in an installed pool, equal to the sum of S plus K.

There is a need for solutions that allow sharing a single transceiver amongst multiple users for a plurality of purposes. Such a need may occur when it is desired to reduce a number of terminals for providing service, from an alternative point of presence (POP) of a protected communication path, where a number of terminals on a communication path is reduced while they become shared amongst multiple users. At the same time, it is possible to take advantage of multiple available communication paths for purposes such as load balancing. There is also a need to allow removing certain users from a shared channel of a single terminal of a primary or protected path, in order to allow a greater level of sharing amongst remaining users while at the same time ensuring that the removed users are moved to one or more additional terminals, each with their own separate shared channels. The present disclosure introduces, as a non-limiting example, Wavelength Division Multiplex Passive Optical Network (WDM-PON) techniques using Dynamic Bandwidth Allocation (DBA) to dynamically offload primary or protected communication paths, or both.

In a typical WDM-PON deployment, with 100 GHz grid spacing, an overall capacity of a communication link is provided by a channel pool that may be formed by 32 or 40 dense wavelength division multiplexing (DWDM) lambdas in the DWDM L band, in a downstream direction, and 32 or 40 DWDM lambdas in the DWDM C band, in an upstream direction. In a group of N users getting access to a data network via a multiplex module connected to a POP via a communication link having a limited number of installed channels or installed sub-channels, a number M of users may have high priority requirements in the form of bitrates that are higher than an average bitrate that the communication link may provide for all N users. These M users thus consume a disproportionate portion of the overall capacity of the communication link. At the same time, a number N–M of users may be satisfied with a reasonable service guarantee and may only require a proportional use of the overall capacity. The number M may represent zero (0), one (1) or more users, but is generally lower than N, oftentimes significantly lower than N.

Telecommunications network operators regularly establish certain parameters when configuring their equipment to meet Service level agreements (SLA) contracted with their users. Such SLA parameters may define various quality of service (QoS) criteria for the N users. Of these, a SLA parameter value for the M users may specify that they have a higher bandwidth allocation priority while a SLA parameter value for the remaining N–M users may specify that they have a lower bandwidth allocation priority. When a fault condition occurs in the data network, the SLA parameter value of the N–M users may determine that their guaranteed data rate will be lower than usual. However, the SLA parameter value of the M higher bandwidth allocation priority users may determine that their guaranteed data rate is to be maintained at all times, or at least not reduced below a minimal level.

In another aspect, one or more of the M users may be defined as users requiring a disproportionate amount of bandwidth for short period of times or for specific flows of information. High priority granted to M users having high bandwidth needs is thus not necessarily based on a particular SLA parameter; the M users may be granted a high priority based on other factors, including actual bandwidth usage.

In case of failure of the communication link between the multiplex module and the POP, including the case of failure at the POP itself, an alternative POP may provide a redundant connection. It may be a desired outcome to provide a redundant connection for purposes of load sharing or load balancing. The redundant connection may be provisioned for providing a lesser amount of effective available bandwidth per circuit over a shared medium, in order to save additional costs related to this redundant infrastructure. A first portion of the bandwidth is provided to the M high priority users. A second portion of the bandwidth available in the redundant connection is shared between the N–M users.

Referring now to the drawings, FIG. 1A is a first example of a network topology for providing redundant connections to a plurality of users. A network 100 has a topology for supporting redundant connections to N users 114 of a local convergence point 110 interfacing with the network 100 via a remote multiplex module 112 connected to a first communication path 120 and to a second communication path 130.

A first point of presence (POP) 140 comprises N terminals, for example transceivers 144 which may be laser-equipped transceivers, connected to external nodes (not shown) communicating with each of the N users 114 via the network 100. The first POP 140 also comprises a multiplex module (MUX) 142 connected to the transceivers 144 and to the first communication path 120. The first POP 140 normally serves each of the N users 114 via N corresponding installed channels (not specifically shown) on the first communication path 120. The first POP 140 thus provides dedicated channels per users 114 between the MUX 142 and the remote multiplex module 112. Of course, a number of available wavelengths, or lambdas, on the first communication path 120 may exceed a number of installed channels. Also, the first POP 140 may be provisioned with a number of installed channels that exceeds the number N.

A second POP 170 comprises a channelizer 174 connected to the same external nodes (still not shown) communicating with each of the N users 114. The second POP 170 also comprises a MUX 172 connected to the channelizer 174 and to the second communication path 130. The channelizer 174 comprises a switch 176, S main terminals for serving N–M of the users, a main terminal including for example a shared terminal 190 formed by a broadband laser 178 and a tunable filter 180, and K additional dedicated terminals $182_i$. When the channelizer 174 comprises dedicated terminals such as the terminals $182_1$ and $182_2$, M remaining, high priority users may be offloaded from the S main terminals and individually served by the dedicated terminals, as long as M does not exceed K. Those of ordinary skill in the art will appreciate that the MUX 172 may have a different construction from that of the MUXes 112 and 142 since the latter simply multiplex wavelengths while the MUX 172 also needs to combine signals at variable wavelengths.

In a variant, T additional instances (not expressly shown) of shared terminals similar to unit 190, may be used, instead of K instances of dedicated terminals $182_1$ and $182_2$, for serving the M remaining, high priority users. In this case, each of the T shared terminals may serve a M/T fraction of the M remaining users.

In yet another variant, T additional instances of shared terminals, similar to unit 190, may be combined with K dedicated terminals $182_1$ and $182_2$, for serving the M remaining, high priority users. In this case, each of the T shared terminals may serve a M/(T−K) fraction of the M remaining users.

The illustrative and non-limiting channelizer 174, as shown on FIG. 1A, comprises one (1) installed shared channel (S is equal to one), in which one (1) wavelength is supported by the shared terminal 190, and two (2) installed dedicated terminals (K is equal to two), in which two (2) wavelengths are supported by the dedicated terminals $182_1$ and $182_2$. The illustrated channelizer 174 thus supports three (3) installed channels. Variants may comprise various combinations of S equal to or greater than one (1) with K also equal to or greater than one (1), the K installed channels being either dedicated channels, shared channels, or a combination of dedicated and shared channels.

In an embodiment, in case of failure of the first communication path 120, including failure of any component of the POP 140, based on the SLA parameters, N−M of the users 114 may be served via one or more of S first channels of the second communication path 130, M remaining users being served via K channels of the second communication path 130.

The overall capacity provided by the second POP 170 on the communication path 130 may be expressed as an installed channel pool L that is the sum of the S (one or more) shared optical channels added to the K (zero, one, or more) dedicated or shared optical channels. Such channel pool is supported by one or more shared terminals 190, supporting the N−M users on the S shared channels, plus one or more shared or dedicated terminals, supporting the M remaining users on the K shared or dedicated channels.

In a variant, users 114 may be connected to the same external nodes (still not shown) through the switch 176 of the second POP 170 without being connected to the first POP 140, thus benefitting from the reduced costs of the shared terminals 190. Equipment installed at the POP 170 may thus be used for serving the N users connected via the multiplex module 112, in the absence of any other POP, while accounting for SLA parameters of the N users, including the M users having high bandwidth requirements.

Those of ordinary skill in the art will appreciate that the topology of the network 100 is greatly simplified. For example, each of the POPs 140 and 170 may comprise a plurality of MUXes and may connect with a plurality of multiplex modules via a plurality of communication paths. Hence, each of the POPs 140 and 170 may normally serve several groups of users at some multiplex modules while supporting redundant connections for other groups of users at other multiplex modules.

Variations from the topology of the network 100 may be envisioned. For example, shared terminals 190 and dedicated terminals 192 may actually be transceivers and thus comprise bidirectional equipment. The tunable filter 180 may also be placed in front of a receiving end of a transceiver. The broadband laser 178 and the tunable filter 180 may be substituted by a tunable laser, which is also capable of emitting light in colors assigned to each of the N−M users. The broadband laser 178 and the tunable filter 180 may also be replaced by a tunable transceiver, which may incorporate tunability functionality on a transmission laser and/or on a receiving photodiode. Additionally, equipment of POPs 140 and 170 may be co-located in a common facility while being connected to communication paths 120 and 130 following distinct routes toward the remote multiplex modules 112 and toward the users 114.

All N users may be served by a shared bandwidth pool S served by a single shared terminal 190. Owing to chosen network provisioning parameters, such as SLA validation, a subset M of the N users may be allowed to make disproportionate use of the shared bandwidth pool S. These M users may then be offloaded to one or more available installed channels $K_1 \ldots K_j$, wherein the channels $K_1 \ldots K_j$ become dedicated for each M user now served by one or more dedicated terminals $182_1 \ldots 182_j$. Put simply, allocating dedicated channels $K_1 \ldots K_j$ to each of the M users implies installing a number K of dedicated channels that is at least equal to M.

When M is equal to one (1), a single dedicated channel in the channel pool L may be allocated to one (1) user and served by terminal $182_1$ dedicated to a single installed channel $K_1$.

In another situation, where M is greater than one (1), and wherein K is equal to one (1), a shared bandwidth of a single shared channel $K_1$ may be allocated to all M remaining users, the shared channel $K_1$ being supported by equipment similar to the shared terminal 190, instead of the terminal $182_1$.

In a situation where the additional shared terminal of one shared channel $K_1$ is able to satisfy network provisioning parameters, such as the SLA for M users, another terminal such as terminal $182_2$ may become a stand-by channel that may be dynamically allocated to a given one of the M users who is permitted to exceed such network provisioning parameters. Those of ordinary skill in the art will appreciate that the channelizer 174 may be modified by installing, in addition to the S shared terminals 190 for serving the N−M users, a number K of additional terminals, this number K optionally being further split into some dedicated terminals $181_i$ and into additional instances of shared terminals 190 for collectively serving the M remaining users.

As shown on FIG. 1A, M, which is the number of users categorized as making disproportionate use of bandwidth, may be equal to the number of additional installed channels K. An operator may provision the number K of dedicated installed channels to match an expected number M; this equality is one of possible options and is not intended to limit the present disclosure.

Optionally, all terminals $182_1 \ldots 182_j$ may be substituted by additional instances of shared terminals 190, providing j standby instances of a shared bandwidth pool, each supporting M/K high priority users, rather than providing dedicated installed channels to each of the N or M users. Additional details of operation of some components of the POPs are provided in the description of the following Figures.

In yet another variant, the switch 176 may have the ability to monitor a bandwidth usage of packet flows transiting through the switch 176 at the packet switched level. The switch 176 may further be capable of automatically transferring a packet flow to an optical path having K dedicated colors, or to a variable color (shared) optical path. Further, the switch 176 may have the ability to assign TDM or TDMA timeslots to each of variable colors in the variable color path. This may ensure that effective bitrates offered to each user meet desired level of quality of service (QoS) or SLA parameters.

The switch 176 may be programmed to use a TDM or TDMA process or to use any other suitable coding technique capable of synchronizing the shared terminal 190, for example the tunable filter 180, with a scheduler (not shown) of the switch 176, in order to enable the possibility of assigning or re-assigning one or more packet flows exceeding the capability of the switch to maintain the network provisioning or committed SLA or satisfy the overall usage across a variable color optical path, statically or dynamically, to a separate K+1 variable color or dedicated color optical path, thereby freeing capacity on the previous variable color optical path.

Figure 1B:
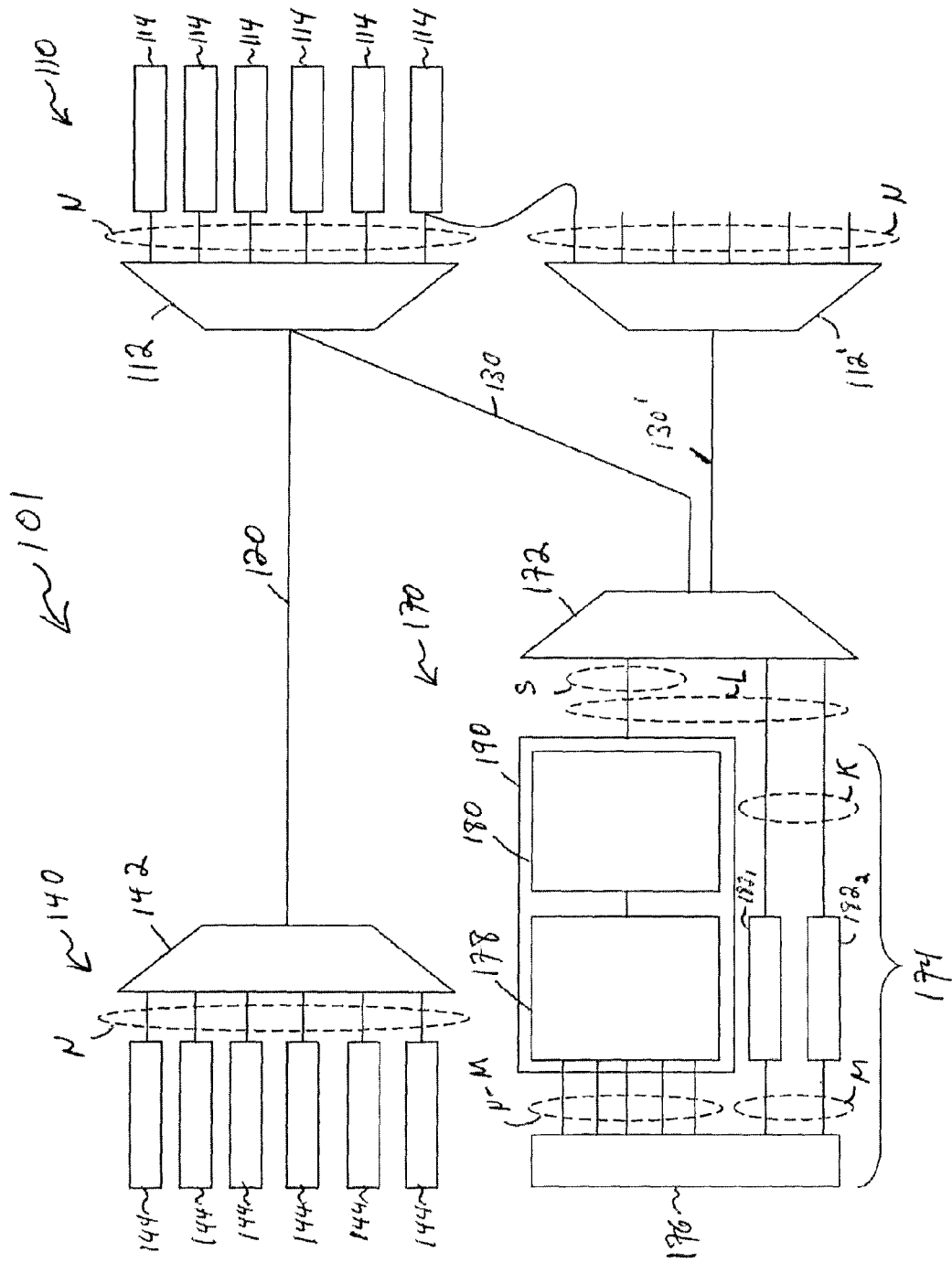
FIG. 1B is a second example of a network topology for providing redundant connections to a plurality of users.

FIG. 1B is a second example of a network topology for providing redundant connections to a plurality of users. In this variant, a network 101 has a topology for supporting redundant connection to N users 114 of a local convergence point 110 via two instances of remote multiplex module 112, including a first instance (112) connected to both a first communication path 120 and a second communication path 130, and a second instance (112') connected to an additional communication path 130'. In the network 101, one or more of the users 114 have communication paths through both instances of the remote multiplex modules 112 and 112'.

Figure 2:
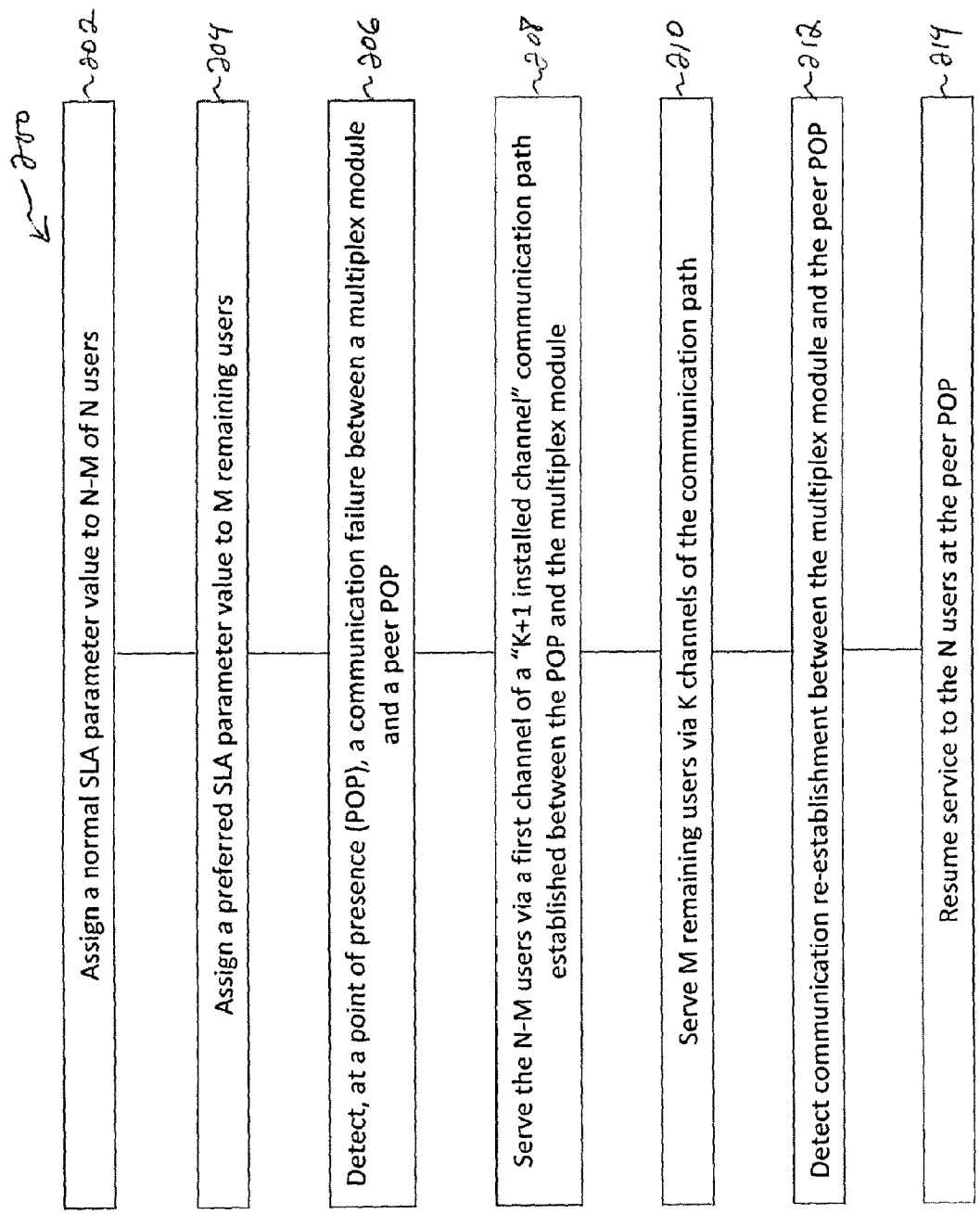
FIG. 2 is a sequence diagram showing operations of a method for providing redundant connections to a plurality of users according to an embodiment.

FIG. 2 is a sequence diagram showing operations of a method for providing redundant connections to a plurality of users according to an embodiment. A sequence 200 for providing connection redundancy to N users comprises several operations, as expressed hereinbelow. In one or more variants, some of the operations may be omitted or may occur concurrently or in a different order from that shown on FIG. 2. The sequence 200 is described from the point of view of a POP whose function is to provide connection redundancy to N users normally served by a peer POP and interfacing with a network via a multiplex module in communication with the peer POP. This POP has a communication path established towards the multiplex module. The communication path between the POP and the multiplex module has K+1 installed channels.

The sequence 200 may comprise an operation 202 of assigning a normal service level agreement (SLA) parameter value to each of N−M users and an operation 204 of assigning a preferred SLA parameter value to each of M remaining, high priority users. At operation 206, the POP may detect or otherwise be informed of a detection of a communication failure between the multiplex module and the peer POP, including a failure of the peer POP itself. At operation 208, responsive to the detection, the POP may serve N−M of the N users via a first channel of the communication path. The POP may use a time division multiplex (TDM) protocol on the first channel of the communication path for serving the N−M users. At operation 210, the POP may serve the M remaining users via K channels of the communication path.

Because the peer POP normally serves the N users, a communication re-establishment between the multiplex module and the peer POP may be detected at operation 212. Responsive to the detection of operation 212, service to the N users may resume at the peer POP, at operation 214.

Data flows reaching the multiplex module and the N users may be unidirectional or bidirectional. Hence, the multiplex module may be a multiplexer, a demultiplexer or a multiplexer-demultiplexer. In addition, service to the N users may comprise forwarding data flows from the POP towards the multiplex module and receiving at the POP data flows from the multiplex module.

In the sequence 200, values M and K may be equal or may differ. For example, if a single user, among the N users, requires disproportionately higher bitrates than the N−M users, M and K may both be equal to one (1). By extension, cases where M and K are equal reflect situations where there are at least as many additional installed channels K as there are higher-priority users M. More generally, if more than one user requires high priority, M thus being greater than one (1), a number of K channels may be set equal to M or, alternatively, the number K may be calculated so that a contractual level of service can be maintained for the M high priority users. When M and K are not equal, or where it is desirable to provision fewer stand-by terminals 182 than M despite K being greater than M, a TDM protocol may be used on one or more of the K channels of the communication path for serving the M remaining users. In many practical applications, N will be much larger than M, for example 10+ times larger than M. For example, the communication paths between the POP and the multiplex module and between the peer POP and the multiplex module may be optical paths. In a dense wavelength division multiplexing (DWDM) optical fiber system, N may be equal to 40 users on a single fiber while M may be equal to 1 or 2 high priority users consuming disproportionately higher bitrates than the N−M users.

A variant of the sequence 200 may comprise defining K+S installed channels on a communication path, in which case operation 208 defines serving the N−M users via S first channels of the K+S channel communication path established between the POP and the multiplex module. Remaining N−M users are still served on the K channels, at operation 210.

In another variant, operations 202, 204, 208 and 210 may be implemented in the context where a POP serves the N users without support from any peer POP. This variant may also comprise defining K+S installed channels, where K and S are both equal to one or more than one. Though this variant does not necessarily support redundant connections, a resulting method allows accounting for SLA parameters of the various users, including M users having high bandwidth requirements.

Figure 3:
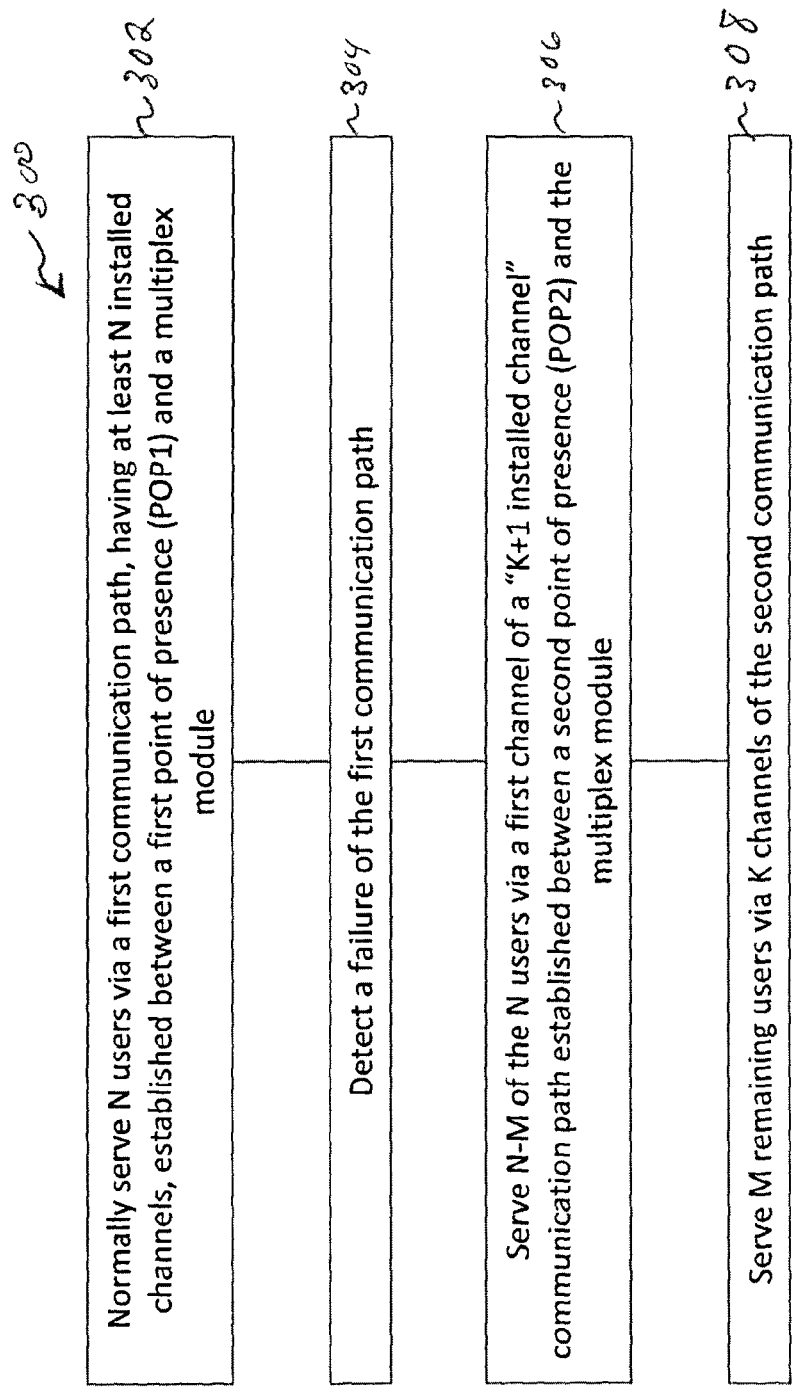
FIG. 3 is a sequence diagram showing operations of a method for providing redundant connections to a plurality of users according to an alternative embodiment.

FIG. 3 is a sequence diagram showing operations of a method for providing redundant connections to a plurality of users according to an alternative embodiment. A sequence 300 for providing connection redundancy to N users comprises several operations, as expressed hereinbelow. In one or more variants, some of the operations may be omitted or may occur concurrently or in a different order from that shown on FIG. 3. In the sequence 300, N users interface with a network via a multiplex module. A first communication path having at least N installed channels is established between the multiplex module and a first point of presence (POP1). A second communication path having K+1 installed channels is established between the multiplex module and a second point of presence (POP2). The sequence 300 comprises an operation 302 of normally serving the N users via the first communication path. When a failure of the first communication path or of the POP1 is detected at operation 304, N−M of the N users may be served at operation 306 via a first channel of the second communication path while M remaining users may be served at operation 308 via K channels of the second communication path. As in the case of the sequence 200, M and K may be equal or may differ.

In a variant, the first communication path may be a N color optical path and the second communication path may comprise a variable color optical path and a K color optical path. Serving the N−M users via the first channel of the second communication path may thus comprise serving the N−M users, in sequence, using the variable color optical path and may also comprise serving the M remaining users via the K channels of the second communication path by assigning one of the K colors to each group of M/K remaining users. Where M is not an integer multiple of K, the M remaining users may be unevenly distributed among the groups.

In another variant, the sequence 300 may comprise defining K+S installed channels on a communication path, in which case operation 306 defines serving the N−M users via S first channels of a K+S channel communication path established between the POP2 and the multiplex module. Remaining N−M users are still served on the K channels, at operation 308.

Figure 4:
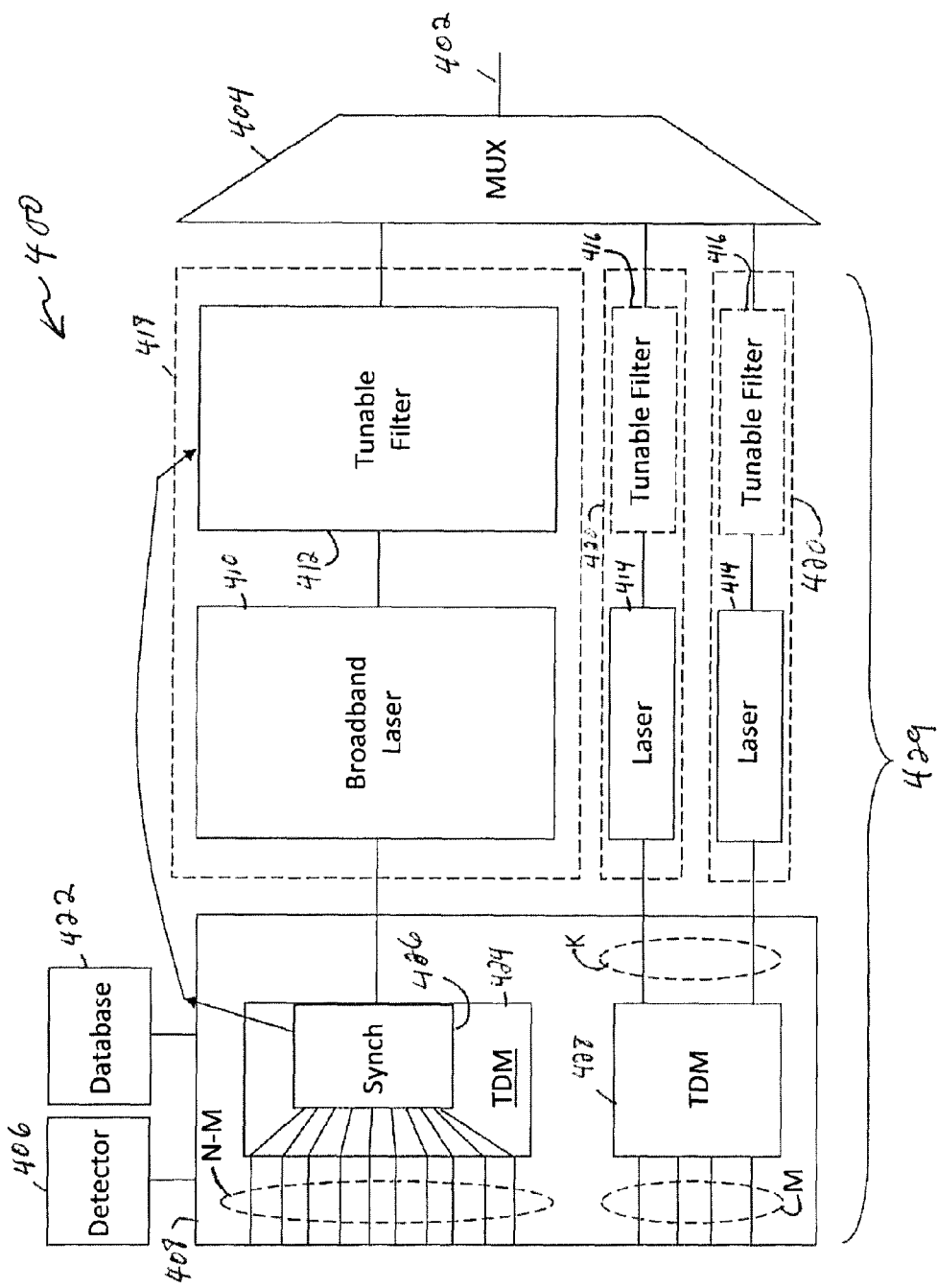
FIG. 4 is a point of presence equipment block diagram according to an embodiment.

FIG. 4 is a point of presence equipment block diagram according to an embodiment. A POP 400 is capable of providing redundant connections to N users interfacing with a network via a multiplex module. The N users are normally served by a peer POP (for example the POP 140 shown on FIG. 1). The POP 400, which is an example embodiment of the POP 170 of FIG. 1, comprises a detector 406 of a communication failure between the multiplex module and the peer POP, a MUX 404 having one or more communication port 402 supporting K+1 installed channels of a communication path established toward the multiplex module, and a channelizer 429 for serving N−M users via a first variable color channel through the MUX 402 for and serving M remaining users via K variable or dedicated color channels through the MUX 402. The channelizer 429 comprises a switch 408, which further comprises a time division multiplexer 424 capable of applying TDM, TDMA, and other coding techniques, a main terminal associated with the first channel for serving N−M of the users, and K additional terminals associated with the K channels for serving M remaining users. The communication path may be an optical path, in which case the main terminal may comprise a broadband laser 410 and a tunable filter 412 while the K additional terminals may comprise K additional lasers 414. The tunable filter 412 is capable of sequentially selecting, from the broadband laser 410, colors assigned to each of the N−M users. The broadband laser 410 and the tunable filter 412 may be substituted by a tunable laser 418, which is also capable emitting light in colors assigned to each of the N−M users.

The POP 400 may comprise a database 422 for storing a SLA parameter value for each of the N users, the SLA parameter values indicating a normal service level for the N−M users and a preferred service level for the M remaining users, which may be high priority users. The database 422 provides the SLA parameter values to the channelizer 429, more specifically to the switch 408. The database 422 may be co-located with the POP 400, comprise equipment within the POP 400, or may alternatively be located elsewhere in a network, for example at a Network Operation Center.

In the switch 408, the TDM 424 sequentially assigns a bandwidth of the first channel of the communication port 402 to the N−M users. In a variant, the TDM 424 may further comprise a synchronizer 426 for dynamically synchronizing assignment of the bandwidth with an incoming data flow bandwidth for each of the N−M users. The TDM 424 and its synchronizer 426 being operably connected to the broadband laser 410 and to the tunable filter 412, the TDM 424 may sequentially assign the bandwidth of the first channel of the communication port to the N−M users by selecting, from the first broadband laser, colors assigned to each of the N−M users while the synchronizer 426 synchronizes the tunable filter 412 with the incoming data flow bandwidth of each of the N−M users.

When the POP 400 comprises a number K of lasers 414 at least equal to the number M of high priority users, data streams for these M remaining users may pass transparently through the switch 408 and reach the lasers 414. However, in a variant, the M remaining users may be served by K lasers 414, K not being equal to M. For this, the switch 408 may comprise another TDM 428 for assigning one of the K channels to each group of M/K remaining users. Because each of the M remaining users may be assigned a distinct color, the K lasers 414 may each be associated with one of K tunable filters 416. In a variant, the K lasers 414 and the K tunable filters 416 may be replaced with K tunable lasers 420. The tunable laser 418 may also be replaced by a tunable transceiver, which may incorporate tunability functionality on a transmission laser and/or on a receiving photodiode.

In any case, the MUX 404 integrates data flows from the main terminal, associated with the first channel, and from the K additional terminals, associated with the K channels, and presents those data flows on the communication port 402.

Of course, the POP 400 is greatly simplified for purposes of illustration. The POP 400 may comprise more than one broadband laser 410 paired with more than one tunable filter 412, or more than one tunable laser 418 for serving the N−M users over more than one channel. The number of lasers 414, tunable filters 416 or tunable lasers 420 is not limited by the illustration of FIG. 4. The POP 400 may further comprise many more elements (not shown) as is well known to those of ordinary skill in the art. For example, in a variant, the POP 400 may support bi-directional data flows, in which case the MUX 404 is a multiplexer-demultiplexer while the channelizer 429 comprises bidirectional terminals, also called transceivers, or associated sending and receiving terminals. The same or other variants may comprise other types of terminals besides lasers, including radiofrequency (RF) terminals, while the communication port 402 may comprise a coaxial cable connection to a cable communication path. Other variations will readily come to mind to those of ordinary skill in the art having the benefit of the present disclosure.

Various embodiments of the topology, equipment and methods for providing redundant connections to users, as disclosed herein, may be envisioned. Although the topology between shared terminals 190 and users 114 as shown on FIGS. 1A and 1B may be point to point, other embodiments and variants may comprise a point to multipoint topology between a shared terminal 190 and a plurality of terminals 114 through a multiplex module 112.

A multiplex module 112 may for example be an Athermalized Arrayed Waveguide Grating (AAWG) WDM-PON remote node device which may route cyclically both DWDM L and C band channels of individual client ports onto a single common port containing all DWDM L and C band client channels.

In this topology, a shared terminal 190 at one end of the link will send multiple flows of information over multiple channels to a plurality of terminals 114 on the other end of the communication paths 120 or 130, acting as point to multipoint shared media, through the remote multiplex module 112

Of course, the number of flows on any single channel may exceed one (1), regardless, a single flow may be mapped onto a single channel such as a WDM-PON channel.

As an example, in a WDM-PON setting through a 40-channel remote node, a single Ethernet flow capable of a maximum line rate of one (1) gigabits per second (GBPS) can map to a single WDM-PON dedicated color optical path.

Another variant may involve dynamic addition of multiple shared terminals 190 at the hub such that an Array of shared terminals 190 may be installed at either of the first POP 140 or the second POP 170. A shared terminal 190 may then tune to a S channel of a variable color path multiple times per second. Various methods may be employed by the shared terminals 190 to change channel, whether it is a tunable laser, a broadband laser with a tunable filter, or a combination of both.

Of course, the latency of any given flow through a shared terminal 190 is a function of the speed of the S shared terminals 190. The latency may vary between N colors on the S shared channels variable color path. The method by which variable color channels from the S shared terminals 190 and the fixed colors stemming from the K dedicated terminals 182 are multiplexed through a MUX 172 may benefit from a MUX capable of transmitting a variable color stream on all ports or on a subset of all ports and not just on the common port. Such a function may be achieved through many different means known at this time, such as a 3 dB 1×2 coupler, a planar lightwave circuit (PLC) power splitter, a multicast switch, a 3D micro electro mechanical systems (MEMS) optical switch, a bandpass filter, a cyclic bandpass filter, and the like.

In another variant, the common port of the MUX 172 may interface with both communication paths 120 and 130 through an optical protection switch (not shown), which may switch an aggregated output of MUX 172 to one or more communication paths to the remote multiplex module 112. The process by which the preferred communication path is chosen may be based on the working status of the communication path in the sense that should it be no longer working, the optical protection switch would latch on the other communication path than the failed communication path.

Further, the process by which the N−M user flows are identified and assigned to S shared channels terminals 190 dynamically may be a function of the amount of committed bandwidth necessary to satisfy the collective requirement of all remaining M priority users based on different usual settings such as: Committed Information Rates, Excess Information Rates, Maximum Line Rates, Service Level Agreements, Minimization of the latency, Maximization of the throughput within a pre-set latency requirement, and the like. This process could be performed on both ends of the link, both at the hub and the spokes, were the spokes outfitted with the same apparatus as the hub.

Those of ordinary skill in the art will realize that the description of the topology, equipment and methods for providing redundant connections to users are illustrative only and are not intended to be in any way limiting. Other embodiments will readily suggest themselves to such persons with ordinary skill in the art having the benefit of the present disclosure. Furthermore, the disclosed topology, equipment and methods may be customized to offer valuable solutions to existing needs and problems of connection redundancy in telecommunication networks.

In the interest of clarity, not all of the routine features of the implementations of topology, equipment and methods for providing redundant connections to users are shown and described. It will, of course, be appreciated that in the development of any such actual implementation of the topology, equipment and methods, numerous implementation-specific decisions may need to be made in order to achieve the developer's specific goals, such as compliance with application-, system-, network- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of telecommunications having the benefit of the present disclosure.

In accordance with the present disclosure, the components, process operations, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of process operations is implemented by a computer or a machine and those process operations may be stored as a series of instructions readable by the machine, they may be stored on a tangible medium.

Systems and modules described herein may comprise software, firmware, hardware, or any combination(s) of software, firmware, or hardware suitable for the purposes described herein. Software and other modules may reside on servers, workstations, personal computers, computerized tablets, personal digital assistants (PDA), and other devices suitable for the purposes described herein. Software and other modules may be accessible via local memory, via a network, via a browser or other application or via other means suitable for the purposes described herein. Data structures described herein may comprise computer files, variables, programming arrays, programming structures, or any electronic information storage schemes or methods, or any combinations thereof, suitable for the purposes described herein.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A method of providing redundant connections to N users interfacing with a network via a multiplex module, comprising:
    detecting, at a point of presence (POP), a communication failure between the multiplex module and a peer POP;
    assigning a normal service level agreement (SLA) parameter value to each of the N−M users;
    assigning a preferred SLA parameter value to each of the M remaining users;
    serving N−M of the N users via S first channels of a communication path established between the POP and the multiplex module, the communication path having K+S installed channels; and
    serving M remaining users via K second channels of the communication path.

2. The method of claim 1, wherein M and K are equal.

3. The method of claim 1, wherein M and K are both equal to one.

4. The method of claim 1, wherein S is equal to one.

5. The method of claim 1, wherein the multiplex module is a multiplexer.

6. The method of claim 1, wherein the multiplex module is a demultiplexer.

7. The method of claim 1, wherein the multiplex module is a multiplexer-demultiplexer.

8. The method of claim 1, wherein the communication path is an optical path.

9. The method of claim 1, comprising using a first time division multiplex (TDM) protocol on the S first channels of the communication path for serving the N−M users.

10. The method of claim 9, comprising using a second TDM protocol on the K second channels of the communication path for serving the M remaining users.

11. The method of claim 1, comprising:
    detecting a communication re-establishment between the multiplex module and the peer POP; and
    resuming service to the N users at the peer POP.

12. A point of presence (POP) for serving N users interfacing with a network via a multiplex module, comprising:
    a communication port supporting K+S installed channels of an optical communication path established toward the multiplex module; and a channelizer for serving N−M users via S first channels of the communication port and for serving M remaining users via K second channels of the communication port; wherein S is equal to one; and the POP further comprises one of:
a first configuration comprising:
a first broadband laser associated with one first channel;
a tunable filter for sequentially selecting, from the first broadband laser, colors assigned to each of the N−M users; and
K additional lasers associated with the K second channels;
a second configuration comprising:
a first tunable laser associated with one first channel for sequentially selecting colors assigned to each of the N−M users; and
K additional lasers associated with the K second channels; and
a third configuration comprising:
a first tunable transceiver associated with one first channel for sequentially selecting colors assigned to each of the N−M users; and
K additional transceivers associated with the K second channels.

13. The POP of claim 12, comprising:
a detector of a communication failure between the multiplex module and a peer POP; wherein
the POP is configured for serving the N users in case of a communication failure between the multiplex module and a peer POP.

14. The POP of claim 12, comprising a database for storing a service level agreement (SLA) parameter value for each of the N users and for providing the SLA parameter values to the channelizer, the SLA parameter values indicating a normal service level for the N−M users and a preferred service level for the M remaining users.

15. The POP of claim 12, comprising a time division multiplexer for sequentially assigning a bandwidth of the S first channels of the communication port to the N−M users.

16. The POP of claim 15, comprising a synchronizer for dynamically synchronizing assignment of the bandwidth of the S first channels of the communication port with an incoming data bandwidth of each of the N−M users.

17. The POP of claim 16, wherein:
the communication path is an optical path;
S is equal to one;
the time division multiplexer is operably connected to a broadband laser and to a tunable filter for sequentially assigning the bandwidth of one first channel of the communication port to the N−M users by selecting, from the first broadband laser, colors assigned to each of the N−M users; and
the synchronizer is capable of synchronizing the tunable filter with the incoming data bandwidth of each of the N−M users.

18. The POP of claim 12, comprising a time division multiplexer for assigning one of the K second channels to each group of M/K remaining users.

19. A method of providing redundant connections to N users interfacing with a network via a multiplex module, comprising:
normally serving the N users via a first communication path having at least N installed channels, established between a first point of presence (POP1) and the multiplex module;

in case of communication failure between the POP1 and the multiplex module:
serving N−M of the N users via S first channels of a second communication path having K+S installed channels, the communication path being established between a second point of presence (POP2) and the multiplex module; and
serving M remaining users via K second channels of the second communication path;

wherein
the first communication path is a N color optical path;
S is equal to one;
the second communication path comprises a variable color optical path and a K color optical path;
serving the N−M users via one first channel of the second communication path comprises serving the N−M users, in sequence, using the variable color optical path; and
serving the M remaining users via the K second channels of the second communication path comprises assigning one of the K colors to each group of M/K remaining users.

20. A method of serving N users interfacing with a network via a multiplex module, comprising:
assigning a normal service level agreement (SLA) parameter value to each of N−M users;
assigning a preferred SLA parameter value to each of the M remaining users;
serving the N−M of the N users via S first channels of a communication path established between a POP and the multiplex module, the communication path having K+S installed channels; and
serving M remaining users via K second channels of the communication path.

21. The method of claim 20, wherein M and K are equal.

22. The method of claim 20, wherein M and K are both equal to one.

23. The method of claim 20, wherein S is equal to one.

24. A point of presence (POP) for serving N users interfacing with a network via a multiplex module, comprising:
a communication port supporting K+S installed channels of an optical communication path established toward the multiplex module; and
a channelizer for serving N−M users via S first channels of the communication port and for serving M remaining users via K second channels of the communication port; wherein
the POP comprises at least one of
a database for storing a service level agreement (SLA) parameter value for each of the N users and for providing the SLA parameter values to the channelizer, the SLA parameter values indicating a normal service level for the N−M users and a preferred service level for the M remaining users; and
a time division multiplexer for sequentially assigning a bandwidth of the S first channels of the communication port to the N−M users.

25. The POP of claim 24, wherein the communication path is an optical path.

26. The POP of claim 24, wherein:
S is equal to one, the POP further comprising:
a first broadband laser associated with one first channel;
a tunable filter for sequentially selecting, from the first broadband laser, colors assigned to each of the N−M users; and
K additional lasers associated with the K second channels.

27. The POP of claim 24, wherein:
S is equal to one, the POP further comprising:
a first tunable laser associated with one first channel for sequentially selecting colors assigned to each of the N–M users; and
K additional lasers associated with the K second channels.

28. The POP of claim 24, wherein:
S is equal to one, the POP further comprising:
a first tunable transceiver associated with one first channel for sequentially selecting colors assigned to each of the N–M users; and
K additional transceivers associated with the K second channels.

29. The POP of claim 24, wherein
when the POP comprises the time division multiplexer it further comprises a synchronizer for dynamically synchronizing assignment of the bandwidth of the S first channels of the communication port with an incoming data bandwidth of each of the N–M users.

30. The POP of claim 29, wherein:
the time division multiplexer is operably connected to a broadband laser and to a tunable filter for sequentially assigning the bandwidth of one first channel of the communication port to the N–M users by selecting, from the first broadband laser, colors assigned to each of the N–M users; and
the synchronizer is capable of synchronizing the tunable filter with the incoming data bandwidth of each of the N–M users.

* * * * *